United States Patent [19]

Morisono

[11] 4,436,174
[45] Mar. 13, 1984

[54] VEHICULAR POWER UNIT SUPPORTING DEVICE

[75] Inventor: Akira Morisono, Saitama, Japan

[73] Assignee: Honda Giken Kogyo Kabushiki Kaisha, Tokyo, Japan

[21] Appl. No.: 420,643

[22] Filed: Sep. 21, 1982

[30] Foreign Application Priority Data

Sep. 28, 1981 [JP] Japan ................ 56-153136

[51] Int. Cl.³ .......................................... B62K 11/04
[52] U.S. Cl. .................... 180/227; 180/228; 280/284
[58] Field of Search ............... 180/228, 227, 219, 215; 280/284, 699; 267/36 R, 41, 160

[56] References Cited

U.S. PATENT DOCUMENTS

| 4,324,306 | 4/1982 | Ishihara et al. | 180/228 |
| 4,372,417 | 2/1983 | Yamamoto et al. | 180/228 |
| 4,373,602 | 2/1983 | Tomita et al. | 180/228 |

FOREIGN PATENT DOCUMENTS 469354 7/1937 United Kingdom ............ 280/284

Primary Examiner—Joseph F. Peters, Jr.
Assistant Examiner—D. Lynn Fugate
Attorney, Agent, or Firm—Irving M. Weiner; Pamela S. Burt; John L. Shortley

[57] ABSTRACT

In a vehicle wherein a rear wheel is supported by a power unit which comprises an integral combination of an engine and a transmission case incorporating a transmission mechanism and which is suspended from a rear part of a vehicle body frame through a damper, a power unit supporting device which supports the power unit for swinging motion at an intermediate portion of the vehicle body frame. The power unit supporting device comprises a front bracket fixed to the vehicle body frame, a rear bracket pivotably connected to the power unit, and leaf spring members having the front and rear ends thereof fixed to the front and rear brackets, respectively, and which cross each other to define substantially an X-shape in side elevation. The power unit supporting device has a relatively high rigidity in the longitudinal direction of the vehicle and in the right and left torsional direction and a relatively low rigidity in the vertical direction.

10 Claims, 6 Drawing Figures

VEHICULAR POWER UNIT SUPPORTING DEVICE

BACKGROUND OF THE INVENTION

1. Field of the Invention

The present invention relates generally to a vehicular power unit supporting device. More particularly, the invention relates to a vehicular power unit supporting device in motorcycles or the like whereby the propagation of engine vibrations to the vehicle body is minimized through a linkage.

2. Description of Relevant Art

There have been known motorcycles or three-wheeled motor vehicles having one front wheel and two rear wheels or vehicles of a similar construction wherein a power unit is constructed by integrating an engine with a transmission case which incorporates transmission means such as a chain for transmitting the engine power to the rear wheel, and the power unit which supports the rear wheel is suspended from a vehicle body frame through cushion means. In vehicles of such a construction, the front portion of the power unit is connected to the vehicle body frame and is supported thereby. It is necessary for a power unit supporting device to have high rigidity in the longitudinal direction of the vehicle body so that the driving force and braking force may be transmitted from the power unit to the vehicle body at the time of start-up, deceleration and acceleration, and also to have high torsional rigidity for preventing torsion from occurring in the transverse direction of the vehicle body between the vehicle body frame and the power unit. In the vertical direction, such rigidity should be minimized so that the engine vibration caused by operation of an engine having an exciting force acting in the vertical direction can be absorbed to prevent it from being propagated from the power unit to the vehicle body.

For absorbing and shutting-off the propagation of engine vibration from the power unit to the vehicle body, it has heretofore been known to connect a power unit to a vehicle body frame and thereby support it through a link mechanism such as a double link having two hinged joints. In this case, however, end portions of the link are connected through a rubber mount to the vehicle body frame and power unit, and because the rubber has resiliency in all directions, it is difficult to enhance rigidity in the longitudinal direction of the vehicle body and in the torsional direction. Therefore, it has been necessary to provide a rubber mount having a spring rate capable of satisfying the required rigidity in the aforesaid directions.

The present invention effectively overcomes the foregoing problems attendant the conventional vehicular power unit support device.

SUMMARY OF THE INVENTION

The present invention provides a power unit supporting device in a vehicle having a vehicle body frame, at least one rear wheel, an engine, transmission means for transmitting power of the engine to the rear wheel, a transmission case which houses the transmission means, a power unit comprising an integral combination of the transmission case and the engine and rotatably supporting the rear wheel, and cushion means for suspending the power unit from the vehicle body frame. The power unit supporting device comprises a front member fixed to the vehicle body frame, a rear member pivotably connected to the power unit and at least two spring members which cross each other to define substantially an X-shape in side elevation and which have the front and rear ends thereof fixed to the front and rear members, respectively.

It is an object of the present invention to provide a vehicular power unit supporting device having a relatively high rigidity in the longitudinal direction and transverse torsional direction of a vehicle body and a relatively low rigidity in the vertical direction.

The above and further objects, details and advantages of the present invention will become apparent from the following detailed description, when read in conjunction with the accompanying drawings.

DETAILED DESCRIPTION OF PREFERRED EMBODIMENTS

Figure 1:
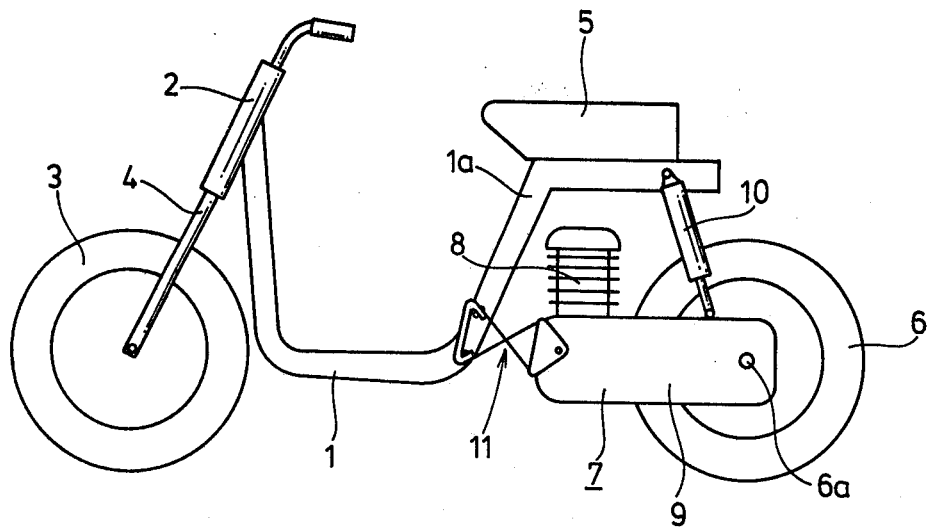
FIG. 1 is a schematic side view of a vehicle provided with a power unit supporting device according to a first embodiment of the present invention.
Figure 2:
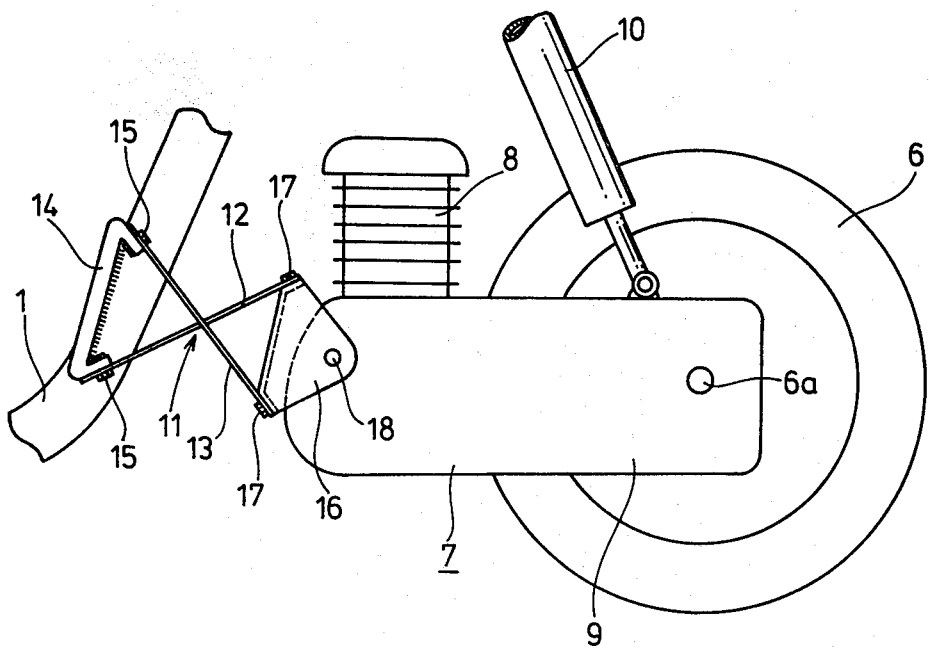
FIG. 2 is an enlarged side view of a principal portion of the vehicle of FIG. 1.
Figure 3:
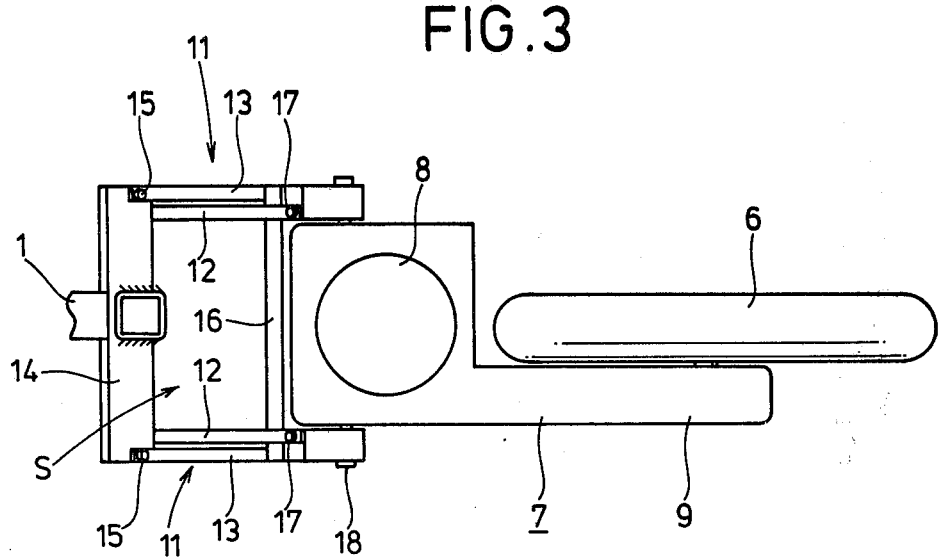
FIG. 3 is a plan view of the vehicular principal portion of FIG. 2.

With reference to FIGS. 1 through 3, there is shown a vehicle body frame 1 to the front end of which is secured a head pipe 2, and a telescopic or other type of front fork 4 which suspends and supports a front wheel 3 is pivotally secured to the head pipe 2 for steering motion to the right and left. Mounted on a seat post portion 1a of the vehicle body frame 1 is a seat 5. A power unit 7, which supports a rear wheel through an axle 6a, comprises an integral combination of an engine 8 and a transmission case 9 which incorporates a transmission means such as a chain for transmitting the engine power to the rear wheel 6. The power unit 7 is suspended from the vehicle body frame 1 through a rear cushion mechanism 10 which comprises a damper mounted between the rear portion of the vehicle body frame 1 and an upper rear surface of the power unit 7.

The front portion of the power unit 7 is connected at least at one side thereof to the vehicle body frame 1 through a cross spring mechanism 11 and is supported thereby. In this embodiment, as shown in FIG. 3, the cross spring mechanism 11 is provided on both right and left sides of the power unit 7. Each cross spring mechanism 11 comprises two inner and outer elastic links 12 and 13 molded from a leaf spring material or a plate-like synthetic resin material having elasticity such as FRP (Fiber-glass Reinforced Plastic) and arranged so as to define substantially an X-shape in side elevation. The front ends of the elastic links 12 and 13 which are arranged in the transverse direction of the vehicle body are secured to a mounting bracket 14 which is fixed to the vehicle body frame 1, by means of fixing members 15 such as bolts or the like, while the rear ends of the elastic links 12 and 13 are secured to a mounting bracket 16 disposed proximal the power unit 7 and being substantially square U-shaped (opening forwardly) in plan, by means of fixing members 17 such as bolts or the like. The mounting bracket 16 is vertically pivotably secured to the power unit 7 through a pivot shaft 18.

Figure 4:
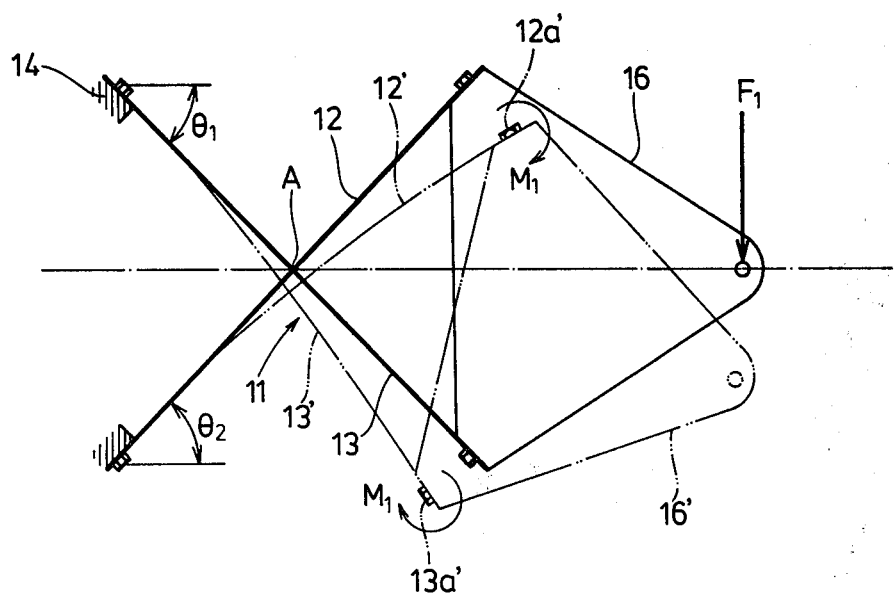
FIGS. 4 and 5 are schematic side views illustrating the operation of the power unit supporting device shown in FIG. 1.
Figure 5:
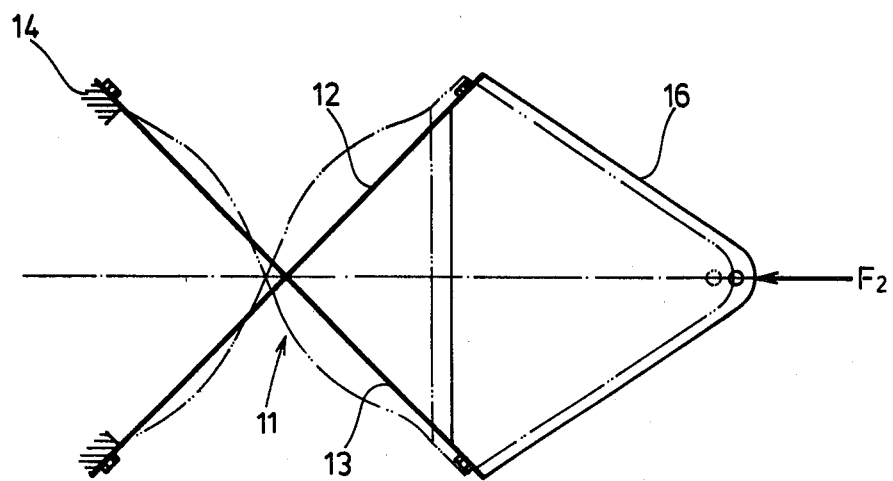

Referring now to FIGS. 4 and 5, as shown in FIG. 4, the two elastic links 12 and 13 are arranged to define substantially an X-shape in side elevation at inclination angles $\theta_1$ and $\theta_2$ from the horizontal direction. Consequently, when a perpendicular load $F_1$ acts on the mounting bracket 16, a moment $M_1$ is exerted on both junctions 12'a and 13'a between bent elastic links 12', 13' and mounting bracket 16'. However, the moments $M_1$ offset each other, allowing the elastic links 12 and 13 to bend as cantilever springs, so that the mounting bracket 16 can easily move up and down. Therefore, the rigidity in the vertical direction of the cross spring mechanism 11 is set at a relatively small value. Consequently, if the power unit 7 is connected to the vehicle body frame 1 through the cross spring mechanism 11 and supported thereby, the vibration of the engine 8, having an exciting force in the vertical direction at substantially right angles to the cross spring mechanism 11, can be absorbed and shut-off at the portion of the cross spring mechanism 11 and thereby prevented from being propagated from the power unit 7 to the vehicle body 1, and thus the cross spring mechanism 11 functions to absorb vibration. The propagation absorbing action for the vibration of the engine 8 is attained by vertical pivoting movements of the mounting bracket 16 substantially about a cross point A of the elastic links 12 and 13, the positions of which change according to the amount of elastic deformation of the cross spring mechanism 11. Because the mounting bracket 16 is vertically pivotably secured to the power unit 7 through the pivot shaft 18, the engine vibration is also absorbed by the pivoting action between the power unit 7 and the mounting bracket 16.

The spring characteristic of the cross spring mechanism 11 becomes softest when the pivoting of the mounting bracket 16 and the bending of the elastic links 12 and 13 are effected in a state of coincidence between the pivoting angle of the mounting bracket 16' and the deflection angle of the elastic links 12' and 13' at the junctions 12'a and 13'a. In this state, the elastic links 12 and 13 function as simple cantilever springs which do not restrain deflection from each other. Such an ideal spring characteristic is obtainable when the inclination angles $\theta_1$ and $\theta_2$ from the horizontal direction of the elastic links 12 and 13 are set at a predetermined angle near 45°. It will be understood that $\theta_1$ and $\theta_2$ may be set at another angle when applying the cross spring mechanism 11 as a power unit supporting mechanism to an actual vehicle such as a motorcycle or the like.

The cross spring mechanism 11 is disposed in exact coincidence with the horizontal direction FIG. 4. When applying cross spring mechanism 11 to an actual vehicle, however, it may be disposed in a slightly inclined manner relative to the horizontal direction in positional relationship to the various vehicular devices, etc., as shown in FIGS. 1 and 2. Even if the cross spring mechanism 11 is so inclined, it is effective in absorbing the vibration of the engine 8 if the direction of exciting force of the engine 8 is in a vertical direction which is substantially within a perpendicular range relative to the cross spring mechanism 11. In the embodiment illustrated in FIGS. 1 and 2, the engine 8 is a vertical type whereby the direction of exciting force of the engine required to permit the cross spring mechanism 11 to exhibit its vibration absorbing effect is vertical. However, there is known a horizontal type engine wherein the direction of exciting force can be made vertical, and thus it will be understood that the engine 8 is not limited to a vertical type engine.

As shown in FIG. 5, when a load $F_2$ in the forward direction of the vehicle body acts on the mounting bracket 16 proximal the power unit 7, the moments produced in the elastic links 12 and 13 by a horizontal forward movement of the bracket 16 restrain each other by the deflection of the elastic links 12 and 13, thus making it difficult for the mounting bracket 16 to move forwardly. Further, at the rear of the vehicle body the mounting bracket 16 is connected to the mounting bracket 14 proximal the vehicle body frame through the elastic links 12 and 13 of a constant length, and therefore the mounting bracket 16 does not substantially move rearwardly of the vehicle body beyond the solid line shown in FIG. 5. Consequently, the cross spring mechanism 11 has a relatively hard spring characteristic in the longitudinal direction of the vehicle body and its rigidity in such direction is high. As a result, the driving force at the time of start-up and acceleration and the braking force at the time of braking, both produced in the rear wheel 6 attached to the power unit 7, are transmitted from the power unit 7 side to the vehicle body side.

Further, because the two elastic links 12 and 13 which define the cross spring mechanism 11 are disposed in opposed relation in the transverse direction of the vehicle body and each has a width dimension extending in such direction, the torsional rigidity of the cross spring mechanism 11 is large enough to substantially prevent vibration from occurring in the right and left or transverse direction of the vehicle body between the power unit 7 and the vehicle body frame 1. Particularly in this embodiment, such torsional rigidity is further strengthened because the cross spring mechanism 11 is provided on both right and left sides of the power unit 7.

In the above construction wherein the cross spring mechanism 11 is provided on both right and left sides of the power unit 7 and the mounting bracket 16 is attached to the power unit 7, a space S is formed between the vehicle body frame 1 and the power unit 7 as shown in FIG. 3, and the space S can be utilized for accommodating, for example, accessory devices of the engine 8.

Figure 6:
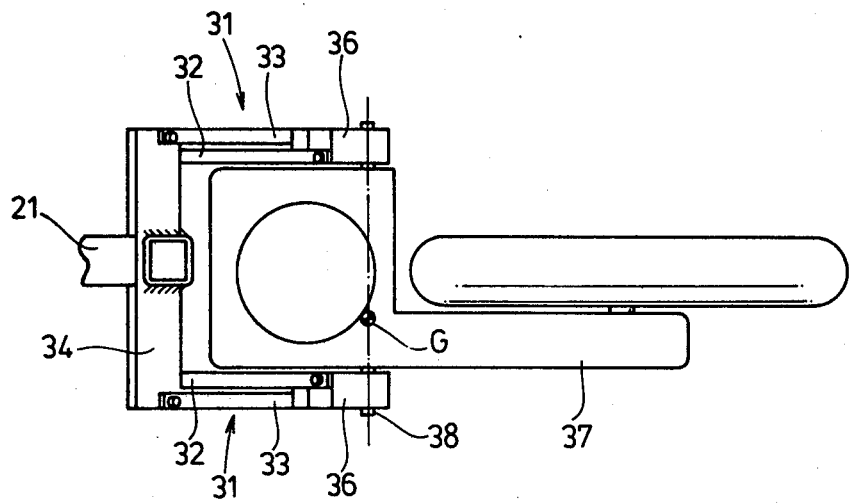
FIG. 6 is a plan view of a principal portion of a vehicle provided with a power unit supporting device according to a second embodiment of the present invention.

In the second embodiment of the invention as shown in FIG. 6, a power unit 37 may be positioned more forwardly than in the foregoing embodiment shown in FIG. 3, and the front portion thereof is inserted between cross spring mechanisms 31, whereby not only the overall vehicular length can be shortened, but also the center of gravity G of the power unit 37 can be positioned on or near an axial line through a pivot shaft 38 connecting between the power unit 37 and mounting brackets 36. Consequently, vibrations produced from the power unit 37 can be prevented more effectively from being propagated to the vehicle body. Such a positional relationship between the pivoted portion of the mounting brackets proximal the power unit and the center of gravity of the power unit can also be realized in the embodiment illustrated in FIG. 3 by increasing the length of the elastic links 12 and 13.

In addition to the advantages described hereinabove, the present invention is further advantageous in that in connecting front and rear ends of the elastic links 12, 13, 32 and 33 which define the cross spring mechanisms 11 and 31 to the mounting brackets 14 and 34 proximal the vehicle body frames 1 and 21 and the mounting brackets 16 and 36 proximal the power unit, even if such links and brackets are interconnected directly and integrally by fixing members such as bolts without any rubber mount connecting members, the rigidity in the longitudinal direction of the vehicle body and in the torsional direction is increased and the rigidity in the vertical direction is decreased, as necessary for absorbing the engine vibration.

In the hereinabove described embodiments of the invention the cross spring mechanisms 11 and 31 comprise two elastic links 12, 13 and 32, 33, respectively. However, it will be understood that the cross spring mechanisms may be constructed of more than two elastic links arranged in the transverse direction of the vehicle body and alternatively extending at different directions of inclination.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I Claim:

1. In a vehicle having a vehicle body frame, at least one rear wheel, an engine, transmission means for transmitting power of said engine to said rear wheel, a transmission case which houses said transmission means, a power unit comprising an integral combination of said transmission case and said engine and rotatably supporting said rear wheel and a cushion means for suspending said power unit from said vehicle body frame, a power unit supporting device comprising:
   a front member fixed to said vehicle body frame;
   a rear member pivotably connected to said power unit; and
   at least two spring members which cross each other to define substantially an X-shape in side-elevation, front and rear ends of said spring members being fixed to said front and rear members, respectively.

2. A power unit supporting device according to claim 1, wherein:
   said engine produces a main exciting force in a substantially perpendicular direction; and
   each of said spring members comprises a leaf spring having a width dimension extending in a substantially transverse direction of said vehicle.

3. A power unit supporting device according to claim 2, wherein:
   said leaf spring is inclined substantially 45° with respect to the horizontal direction.

4. A power unit supporting device according to claim 1, wherein:
   a pair of said spring members are provided on each of right and left sides.

5. A power unit supporting device according to claim 4, wherein:
   said pair of spring members extend in a substantially longitudinal direction of said vehicle in close proximity to each other when viewed from above said vehicle.

6. A power unit supporting device according to claim 1, wherein:
   said cushion means comprises at least one damper, an upper end of said damper being pivotably connected to a rear part of said vehicle body frame and a lower end thereof being pivotably connected to a rear part of said power unit; and
   said front member comprises a bracket disposed in an intermediate position in the longitudinal direction of said vehicle body frame.

7. A power unit supporting device according to claim 6, wherein:
   said rear member is pivotably connected at a front position of a front portion of said power unit.

8. A power unit supporting device according to claim 6, wherein:
   said rear member is pivotably connected at a rear position of a front portion of said power unit.

9. A power unit supporting device according to claim 8, wherein:
   said vehicle has the center of gravity thereof in the vicinity of said engine; and
   said rear member is pivotably connected to a portion of said power unit near said center of gravity.

10. A power unit supporting device according to claim 1, 2, 3, 4, 5, 6, 7, 8, or 9, wherein:
    said vehicle comprises a motorcycle.

* * * * *